US007883313B2

(12) United States Patent
Nies et al.

(10) Patent No.: US 7,883,313 B2
(45) Date of Patent: Feb. 8, 2011

(54) ACTIVE FLOW CONTROL SYSTEM FOR WIND TURBINE

(75) Inventors: Jacob Johannes Nies, Zwolee (NL); Wouter Haans, Den Haag (NL)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/613,157

(22) Filed: Nov. 5, 2009

(65) Prior Publication Data

US 2010/0143122 A1 Jun. 10, 2010

(51) Int. Cl.
*F03D 11/00* (2006.01)
(52) U.S. Cl. .................. 415/121.2; 416/91; 416/146 R
(58) Field of Classification Search ............... 415/121.2
See application file for complete search history.

(56) References Cited

U.S. PATENT DOCUMENTS

| | | | |
|---|---|---|---|
| 3,685,292 | A | 8/1972 | Brown |
| 4,692,095 | A | 9/1987 | Lawson-Tancred |
| 5,275,643 | A | 1/1994 | Usui |
| 5,938,404 | A | 8/1999 | Domzalski et al. |
| 6,629,674 | B1 | 10/2003 | Saddoughi et al. |
| 6,940,185 | B2 * | 9/2005 | Andersen et al. ............... 290/44 |
| 6,972,498 | B2 | 12/2005 | Jamieson et al. |
| 7,354,247 | B2 | 4/2008 | Bonnet |
| 7,363,808 | B2 | 4/2008 | Ormel et al. |
| 7,387,491 | B2 | 6/2008 | Saddoughi et al. |
| 7,420,289 | B2 | 9/2008 | Wang et al. |
| 7,435,057 | B2 | 10/2008 | Parera |
| 7,582,977 | B1 | 9/2009 | Dehlsen |
| 7,802,961 | B2 | 9/2010 | Grabau |
| 2005/0042102 | A1 | 2/2005 | Teichert |
| 2005/0242233 | A1 | 11/2005 | Battisti |
| 2007/0231151 | A1 | 10/2007 | Herr et al. |
| 2008/0181775 | A1 | 7/2008 | Livingston et al. |
| 2009/0304505 | A1 | 12/2009 | Wobben |

(Continued)

FOREIGN PATENT DOCUMENTS

EP 1517033 A1 3/2005

(Continued)

OTHER PUBLICATIONS

David F. Fisher & Michael C. Fischer, Development Flight Tests of Jetstar LFC Leading-Edge Flight Test Experiment, (NASA, Langley Research Center ed., 1987).

(Continued)

*Primary Examiner*—Richard Edgar
(74) *Attorney, Agent, or Firm*—James McGinness, Esq.; Armstrong Teasdale LLP (57) ABSTRACT

An active flow control (AFC) system for use with a wind turbine is provided. The wind turbine includes at least one rotor blade having at least one manifold extending at least partially therethrough and at least one aperture defined through a surface of the at least one rotor blade. The at least one aperture is in flow communication with the at least one manifold. The AFC system includes an air intake duct configured to draw ambient air into the wind turbine, a self-cleaning air filter coupled in flow communication with the air intake duct and configured to filter the ambient air, and an AFC distribution system configured to eject the filtered air through the at least one aperture.

20 Claims, 5 Drawing Sheets

U.S. PATENT DOCUMENTS

2009/0311097 A1    12/2009    Pierce et al.
2010/0135790 A1    6/2010    Pal et al.

FOREIGN PATENT DOCUMENTS

| | | |
|---|---|---|
| GB | 2186033 A | 8/1987 |
| GB | 2466433 A | 6/2010 |
| WO | 2004092577 A1 | 10/2004 |
| WO | 2008080407 A1 | 7/2008 |

OTHER PUBLICATIONS

Gustave P. Corten & Herman F. Veldkamp, "Insects Can Halve Wind-Turbine Power," 412 Nature, 42-43 (2001).

Albert L. Braslow, "A History of Suction-Type Laminar-Flow Control with Emphasis on Flight Research," Monographs in Aerospace History, No. 13, pp. 20, 21, 24 (1999).

Hal Romanowitz, "Alternate Energy Systems Engineering," available at www.oakcreekenergy.com/reports/flash/GCI-20020401.html (last visited Mar. 2, 2009).

Office Action dated Oct. 5, 2010, U.S. Appl. No. 12/613,170, 21 pages.

Office Action dated Aug. 19, 2010, U.S. Appl. No. 12/613,274, 17 pages.

* cited by examiner

ACTIVE FLOW CONTROL SYSTEM FOR WIND TURBINE

CROSS-REFERENCE TO RELATED APPLICATIONS

Cross-reference is hereby made to related, commonly assigned, co-pending applications: Ser. No. 12/613,079 entitled "Method for Operating a Wind Turbine with Reduced Blade Fouling," Ser. No. 12/613,287 entitled "Systems and Methods for Assembling an Air Distribution System for Use in a Rotor Blade of a Wind Turbine," Ser. No. 12/613,013 entitled "Systems and Method for Operating a Wind Turbine Having Active Flow Control," Ser. No. 12/613,268 entitled "Apparatus and Method for Cleaning an Active Flow Control (AFC) System of a Wind Turbine," Ser. No. 12/613,170 entitled "Systems and Method for Operating an Active Flow Control System," Ser. No. 12/613,274 entitled "Systems and Method for Operating a Wind Turbine Having Active Flow Control." Each cross-referenced application is invented by Jacob Johannes Nies and Wouter Haans and is filed on the same day as this application. Each cross-referenced application is hereby incorporated by reference in its entirety.

BACKGROUND OF THE INVENTION

The present disclosure relates to wind turbines. Particularly, the present disclosure relates to an active flow control (AFC) system for use with a wind turbine, a wind turbine rotor blade including such an AFC system, and a wind turbine including such a rotor blade.

Although horizontal axis wind turbines are well-established these days, there is still considerable engineering effort going on to further improve their overall efficiency, robustness, and power generating capability.

This research has lead to the most recent AFC technologies, which aim to improve wind turbine efficiency. AFC technologies try to avoid flow separation over rotor blades by actively modifying the wind flow proximate to the rotor blade. This can be achieved by blowing air through apertures on the surface of the rotor blade.

The introduction of such AFC systems has brought about the fact that the apertures used for blowing air eventually collect dirt or impurities. This phenomenon is one aspect of what is referred to as "blade fouling." Blade fouling can substantially lower the performance, in particular the extracted power of wind turbines.

Many wind turbines are located at remote places, e.g. offshore or in deserts. As service intervals are at minimum half a year with the tendency to get longer, there is a need to keep such an AFC system of a wind turbine clean over a long period of time with a minimum maintenance effort.

BRIEF DESCRIPTION OF THE INVENTION

In one aspect, an active flow control (AFC) system for use with a wind turbine is provided. The wind turbine includes at least one rotor blade having at least one manifold extending at least partially therethrough and at least one aperture defined through a surface of the at least one rotor blade. The at least one aperture is in flow communication with the at least one manifold. The AFC system includes an air intake duct configured to draw ambient air into the wind turbine, a self-cleaning air filter coupled in flow communication with the air intake duct and configured to filter the ambient air, and an AFC distribution system configured to eject the filtered air through the at least one aperture.

In another aspect, a wind turbine is provided. The wind turbine includes a rotor blade, at least one manifold extending at least partially through the rotor blade, an air intake duct configured to draw ambient air into the wind turbine, a gas supply coupled in flow communication with the at least one manifold and configured to supply gas to the at least one manifold, and a self-cleaning air filter coupled in flow communication with the air intake duct and the gas supply. The self-cleaning air filter is configured to filter the ambient air and channel the filtered air to the gas supply.

In yet another aspect, a method for operating a wind turbine is provided. The wind turbine includes an active flow control (AFC) system having a self-cleaning air filter. The method includes drawing ambient air into the self-cleaning air filter such that debris is collected within the self-cleaning air filter, channeling a cleaning air stream into the self-cleaning air filter to dislodge the debris collected within the self-cleaning air filter, and channeling the dislodged debris from the self-cleaning air filter and away from the wind turbine.

Further aspects, advantages, and features of the embodiments described herein are apparent from the dependent claims, the description, and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Modern wind turbines are designed to produce a maximum amount of energy in a particular geographical area. However, if the wind speed becomes too large, and therefore changes an angle of attack above a certain value, flow separation over wind turbine blades occurs and results in stall. In such a situation energy production by the wind turbine is reduced or even prevented. By delaying the flow separation over wind turbine blades, the design of the wind turbine can be favorably changed, e.g. to increase an operational wind speed range and/or to change design parameters, such as chord and/or rotor diameter. This will eventually result in a considerable increase of wind turbine energy production.

Flow separation over wind turbine blades can be delayed by blowing gas out of small apertures defined through a surface of the rotor blade. The gas may be supplied to the apertures through manifolds in the rotor blade via a gas supply. Various gases may be used, such as, but not limited to, air, nitrogen, and/or carbon dioxide. If the term "air" is used in the following description, this is done without any intention to limit the scope of the appended claims. The gas flow rate through the manifolds and out of the apertures is controlled by the gas supply and valves. By controlling a gas flow rate, aerodynamic properties of the rotor blade can be changed, resulting in a delayed flow separation. The system, including the gas supply, valves, manifolds, and apertures, actively controls the gas flow out of the apertures of the rotor blade. This system is sometimes called an active flow control (AFC) system. Accordingly, the apertures are sometimes called AFC apertures.

According to the embodiments disclosed herein, blade fouling, particularly fouling of a manifold included inside a rotor blade, is avoided by filtering the ambient air that is channeled from an gas supply into the manifold. "Ambient air" is understood to particularly include the air around and near the gas supply, or near or inside the wind turbine. In particular, the ambient air can be taken from inside a rotor blade, from inside a rotor hub, a nacelle, and/or a wind turbine tower. Additionally or alternatively, the ambient air may be taken from outside the wind turbine. An air intake duct is used to take in the ambient air.

By filtering the ambient air used by the gas supply as described herein, fewer impurities get into the manifolds of the wind turbine in the first place. The filtering described herein results in reduced fouling of the rotor blades, particularly an AFC system at least partially defined within the rotor blade, and more particularly the manifolds of the AFC system.

Figure 1:
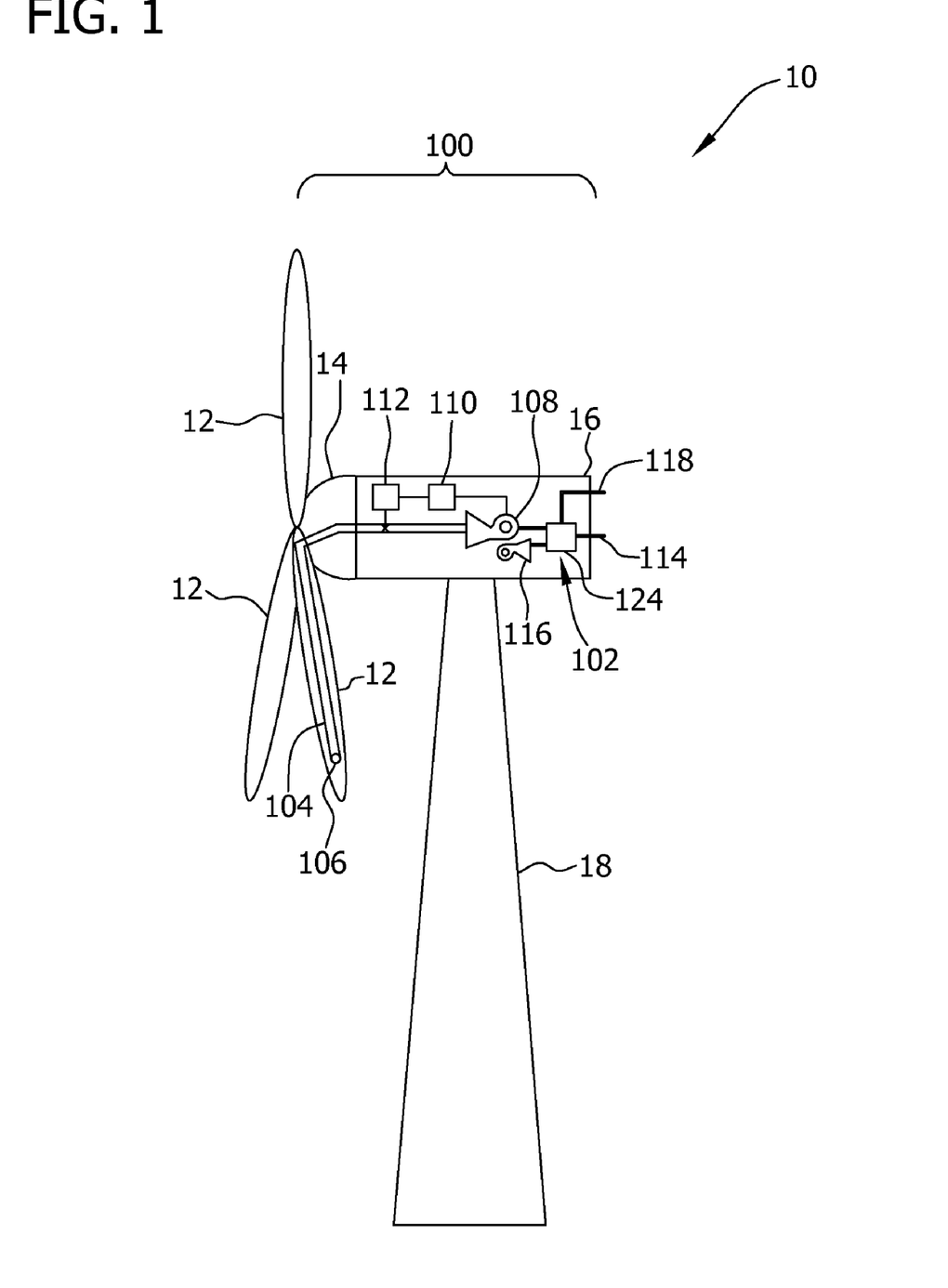
FIG. 1 is a schematic side view of an exemplary wind turbine.

FIG. 1 shows an exemplary wind turbine 10 having an AFC system 100, including a self-cleaning air filter 102. Wind turbine 10 includes three rotor blades 12, but may also have more or less than three rotor blades 12. Rotor blades 12 are mounted on a rotor hub 14, which is connected to a nacelle 16 that is fixed on a top of a tower 18.

In the exemplary embodiment, each rotor blade 12 includes at least one manifold 104 which is connected to an aperture 106 defined through a surface 20 of rotor blade 12. For reasons of simplicity, only one rotor blade 12 having manifold 104 and aperture 106 is depicted. However, any rotor blade 12 of wind turbine 10 can include manifolds 104 and apertures 106. At an upstream end of manifold 104, each manifold 104 is connected to a gas supply 108 from which air is supplied to manifolds 104. In operation, gas supply 108 supplies air to manifolds 104 which is then ejected through apertures 106.

Each rotor blade 12 includes, in the exemplary embodiment, at least one manifold 104 that is in flow communication with at least one aperture 106. An air flow rate through manifolds 104 is controlled by an AFC controller 110 and/or a wind turbine controller, which may be combined or separate components of wind turbine 10. In a particular embodiment, AFC controller 110 controls the air flow rate through manifolds 104 by changing an air flow rate of gas supply 108. In an additional or alternative embodiment, AFC controller 110 controls the air flow rate through manifolds 104 by blocking one manifold 104 of wind turbine 10, thereby increasing the air flow rate through unblocked manifolds 104. This may be used for changing the ejection pattern of the ejected air to change the aerodynamic properties of rotor blade 12. In order to block manifolds 104, AFC controller 110 uses at least one valve 112. As apertures 106 are connected to manifolds 104, the air flow rate through apertures 106 can be controlled by controlling the air flow rate through manifolds 104. According to both embodiments described above, AFC controller 110 can change the aerodynamic properties of rotor blade 12, which typically results in delaying the flow separation over rotor blades 12.

Figure 2:
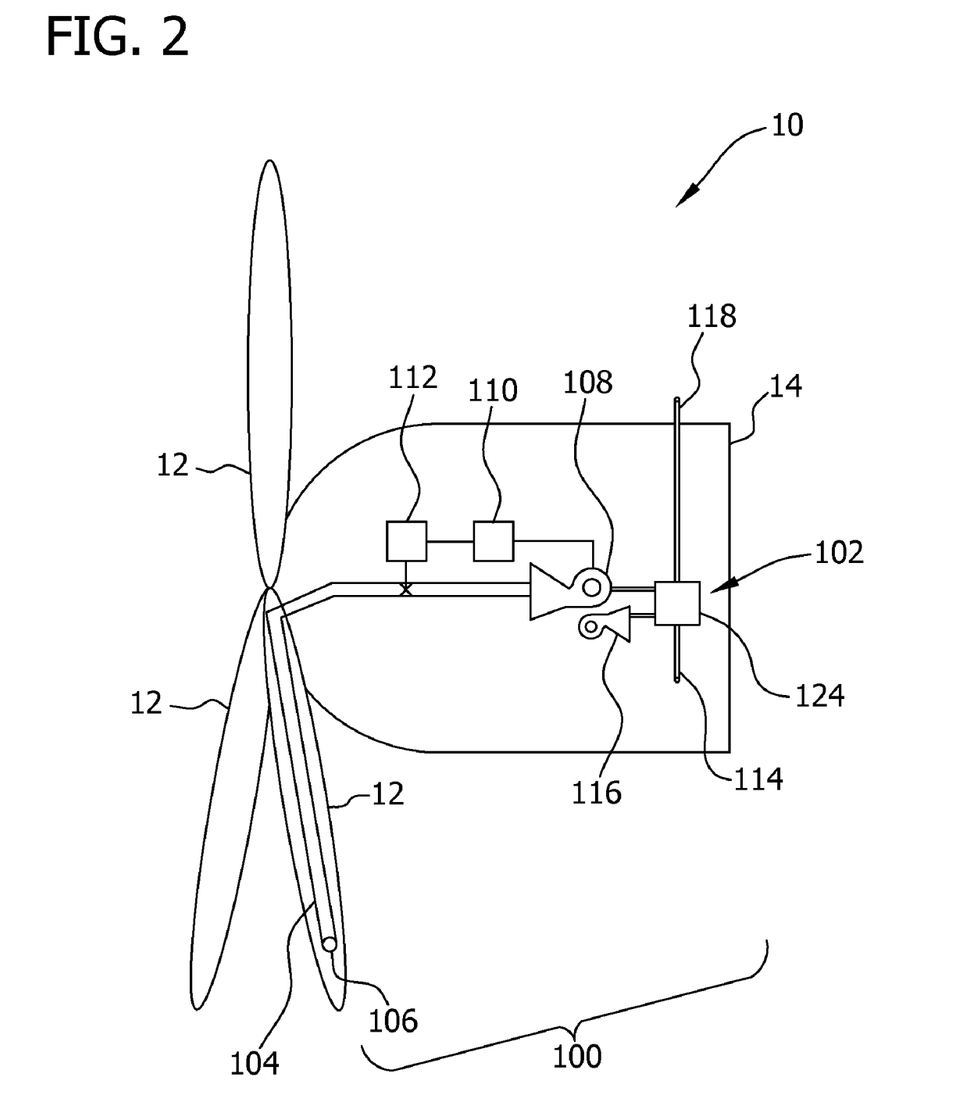
FIG. 2 is a schematic side view of an exemplary rotor hub that may be used with the wind turbine shown in FIG. 1.

FIG. 2 shows rotor hub 14 that may be used wind turbine 10 (shown in FIG. 1). In the exemplary embodiment, rotor hub 14 includes at least a portion of AFC system 100. AFC system 100 includes an air intake duct 114, self-cleaning air filter 102, a pressurized air device 116, an exhaust valve 118, gas supply 108, valves 112, AFC controller 110, manifolds 104, and apertures 106, as described in more detail below.

Figure 3:
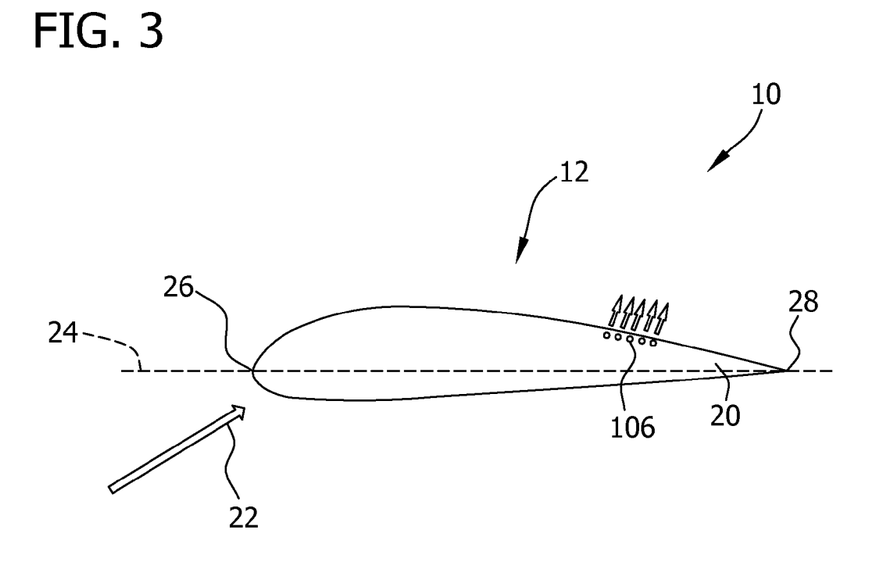
FIG. 3 is a chord-wise cross sectional view of an exemplary rotor blade that may be used with the wind turbine shown in FIG. 1.
Figure 4:
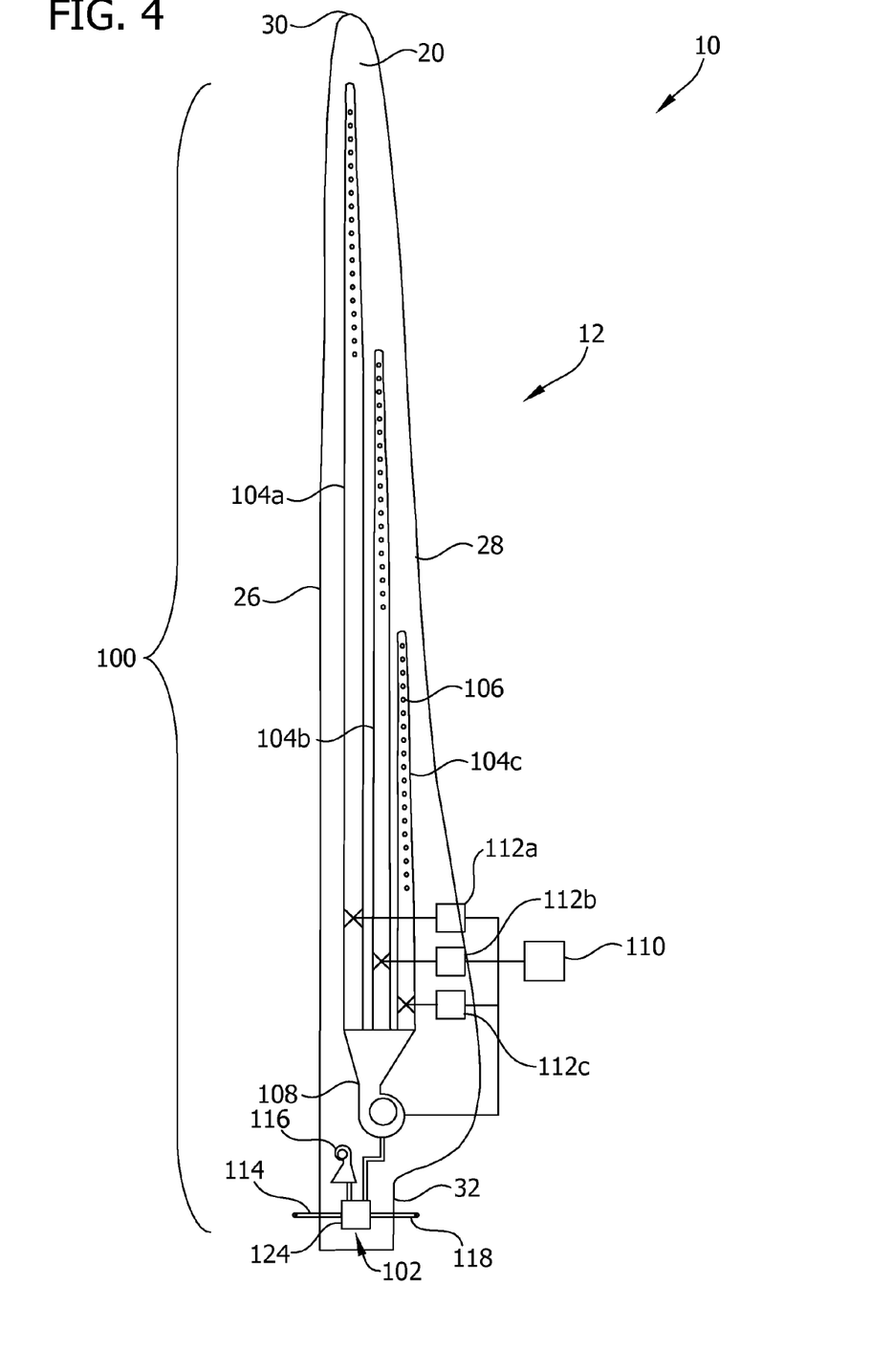
FIG. 4 is a schematic longitudinal cross sectional view of the rotor blade shown in FIG. 3.

FIG. 3 is a chord-wise cross-sectional view of rotor blade 12 being equipped with AFC system 100. FIG. 4 shows a longitudinal cross sectional view of rotor blade 12. Positions of AFC apertures 106 are shown in FIG. 3. Further, in FIG. 3, rotor blade 12 is seen along a span-wise axis of rotor blade 12. In typical situations, a wind direction 22 impinges rotor blade 12 at an area slightly above where a chord line 24 intersects rotor blade 12 at a leading edge 26.

Aerodynamic properties of rotor blade 12 are changed by ejecting air through apertures 106 on surface 20 of rotor blade 12 on its suction side. Apertures 106 are typically positioned on the suction side of rotor blade 12 downwind of an airfoil maximum thickness.

Rotor blade 12 has leading edge 26 on a left hand side of FIG. 4 and a trailing edge 28 on a right hand side of FIG. 4. In the exemplary embodiment, rotor blade 12 includes AFC system 100, which includes gas supply 108 and manifolds 104a, 104b, and 104c. Alternatively, rotor blade 12 may include one or more manifolds 104 extending therethrough. In the exemplary embodiment, gas supply 108 supplies air to manifolds 104a, 104b, and 104c, which are connected in parallel to gas supply 108.

Manifold 104a closest to leading edge 26 is longest manifold 104 and extends almost until a tip 30 of rotor blade 12. Manifold 104c extends to about half of a longitudinal length of rotor blade 12. A length of middle manifold 104b roughly equals an arithmetic average of outer manifolds 104a and 104c. Specific properties of rotor blade 12 described herein are only exemplary. Typically a number of manifolds 104 or apertures 106 of rotor blade 12 may be different from the example shown in FIG. 4. For example, the lengths and/or widths of manifolds 104a, 104b, and/or 104c and/or positions of manifolds 104a, 104b, and/or 104c within rotor blade 12 may vary.

The air flow channeled from gas supply 108 into each of manifolds 104a, 104b, and/or 104c may be blocked by valves 112a, 112b, and/or 112c arranged at or in an onset of manifolds 104a, 104b, and/or 104c after junctions of gas supply 108 and manifolds 104a, 104b, and/or 104c. Valves 112a, 112b, and 112c correspond to and are operatively coupled to manifolds 104a, 104b, and 104c, respectively. Each manifold 104a, 104b, and/or 104c is connected to a respective set of apertures 106. Valves 112a, 112b, and 112c and AFC controller 110 are depicted at least partly outside rotor blade 12 for clarity reason. However, valves 112a, 112b, and/or 112c and/or AFC controller 110 are typically arranged inside rotor blade 12, inside rotor hub 14, or inside nacelle 16.

An air flow rate through manifolds 104a, 104b, and/or 104c is controlled by AFC controller 110. In the exemplary embodiment, AFC controller 110 controls the air flow rate through manifolds 104a, 104b, and/or 104c by changing an air flow rate of gas supply 108. Alternatively or additionally, AFC controller 110 controls an air flow rate through manifolds 104a, 104b, and/or 104c by blocking, e.g. manifold 104a, thereby increasing the air flow rate through unblocked manifolds 104b and 104c. For blocking manifolds 104a, 104*b*, and/or 104*c*, AFC controller 110 may use valves 112*a*, 112*b*, and/or 112*c*. Each valve 112*a*, 112*b*, and 112*c* can be continuously adjusted from completely open to completely closed. It is to be understood that the term "blocking" does not necessarily mean complete blocking, but may also imply partial blocking of manifolds 104*a*, 104*b*, and/or 104*c*. Valves 112*a*, 112*b*, and/or 112*c* thus have a flow control function. If a valve 112*a* is not closed completely, the gas flow through other valves 112*b* and 112*c* is not increased to the same extent as compared to the case in which valve 112*a* closes completely.

If it is intended to clean manifolds 104*b* and 104*c*, the gas flow through manifolds 104*b* and 104*c* needs to be large enough to ensure a cleaning action within manifolds 104*b* and 104*c*. For example, if the gas flow through manifolds 104*b* and 104*c* is not large enough, the gas flow rate of gas supply 108 may be increased and/or valve 112*a* may be closed more completely. In both events, the gas flow through manifolds 104*b* and 104*c* may be increased beyond a value where the cleaning action is large enough to clean manifolds 104*b* and 104*c*. According to alternative embodiments, valves 112*a*, 112*b*, and/or 112*c* may be replaced by other flow control devices that are adapted to control a gas flow through manifolds 104*a*, 104*b*, and/or 104*c*. As apertures 106 are in flow communication with manifolds 104*a*, 104*b*, and 104*c*, the air flow rate through apertures 106 can be controlled by controlling the air flow rate through manifolds 104*a*, 104*b*, and/or 104*c*. According to both embodiments described above, AFC controller 110 can delay the flow separation over rotor blades 12 to change the aerodynamic properties of rotor blade 12.

Figure 5:
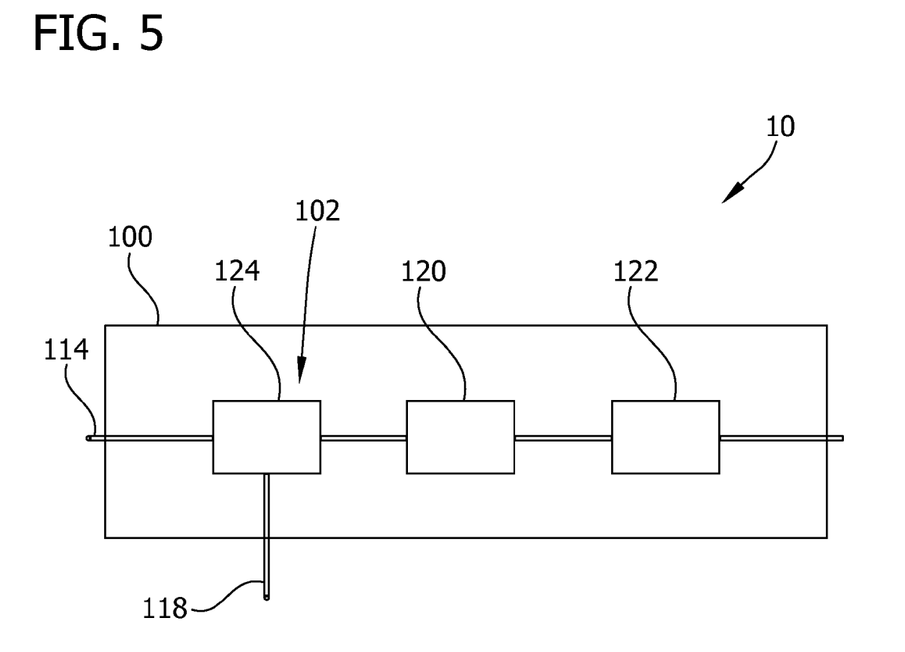
FIG. 5 is a schematic view of an exemplary AFC system that may be used with the wind turbine shown in FIG. 1.

FIG. 5 is a schematic view of AFC system 100 that may be used with wind turbine 10 (shown in FIG. 1). In the exemplary embodiment, AFC system includes an AFC distribution system 120. In one embodiment, AFC distribution system 120 is gas supply 108. Gas supply 108 includes, without limitation, a pump, a pressure tank, a compressed gas cylinder, a compressor, a fan, a pumping device, a blower, and/or any other suitable device. In the exemplary embodiment, AFC distribution system 120 is configured to generate a cleaning air stream for cleaning self-cleaning air filter 102.

AFC system 100 includes an air ejecting system 122 that, in the exemplary embodiment, is realized by manifolds 104. Manifolds 104 are connected to AFC distribution system 120 on their upstream ends. On their downstream ends, manifolds 104 are connected to apertures 106 arranged on surface 20 of rotor blade 12. In this context, the terms "upstream" and "downstream" refer to gas flow directions within AFC distribution system 120. Accordingly, the term "downstream" refers to a direction from AFC distribution system 120 towards air ejecting system 122. In the exemplary embodiment, air ejecting system 122 ejects filtered air through apertures 106 on surface 20 of rotor blade 12. Air which is blown out of rotor blade 12 improves the aerodynamic properties of rotor blade 12 by delaying flow separation as explained above. An air flow rate through manifolds 104 is controlled by an AFC controller 110, as described above.

AFC system 100 includes air intake duct 114 to take in ambient air. More specifically, air intake duct 114 of AFC system 100 takes in ambient air and supplies that air to self-cleaning air filter 102. As such, air intake duct 114 is in flow communication with self-cleaning air filter 102. In the embodiment shown in FIG. 2, the ambient air is taken from inside rotor hub 14, however, in alternative embodiments, the air is taken from the exterior of wind turbine 10. This is typically done using air intake duct 114 as positioned, for example, in rotor hub 14. According to the embodiment shown in FIG. 2, self-cleaning air filter 102 filters the ambient air and channels the filtered air to gas supply 108, which is in flow communication with self-cleaning air filter 102.

More specifically, air intake duct 114 is coupled in flow communication with self-cleaning air filter 102 that is configured to filter the ambient air. Self-cleaning air filter 102 is coupled in flow communication with AFC distribution system 120, which channels filtered air from self-cleaning air filter 102 to air ejecting system 122. More specifically, self-cleaning air filter 102 is in flow communication with gas supply 108 and the ambient air. Further, self-cleaning air filter 102 is, in the exemplary embodiment, located in a root 32 of rotor blade 12. Root 32 may be fixed to rotor hub 14.

Self-cleaning air filter 102 is any suitable filter that is configured to clean its filter element from time to time by removing impurities from the filter element of self-cleaning air filter 102. In the exemplary embodiment, self-cleaning air filter 102 is realized as a back-flushing air filter 124. Back-flushing air filter 124 is a specific type of self-cleaning air filter 102 that is able to clean its filter element by using a back-flushing air stream. To generate such a back-flushing air stream, typically compressed and/or pressurized air is used. This pressurized air flushes out the impurities which, e.g. are torn off a filter element of back-flushing air filter 124. More specifically, the back-flushing air stream is used to tear off the impurities on or at the filter element, and then to flush the impurities into exhaust valve 118. Exhaust valve 118 exhausts the dirt expelled from inside back-flushing air filter 124 to the outside of AFC system 100. Thus, back-flushing air filter 124 can clean itself while simultaneously filtering air.

More specifically, in the exemplary embodiment, back-flushing air filter 124 coupled in flow communication with pressurized air device 116 that compresses the filtered air emerging from back-flushing air filter 124. This compressed and/or pressurized air is then supplied back to back-flushing air filter 124 for use as the back-flushing air stream that cleans back-flushing air filter 124. Alternatively or additionally, the back-flushing air stream is provided by gas supply 108, which is configured to provide a back-flushing air stream. When gas supply 108 and pressurized air device 116 are used, gas supply 108 and pressurized air device 116 may alternately or simultaneously provide the back-flushing air stream.

In the exemplary embodiment, the filter element of self-cleaning air filter 102 is continuously cleaned by a stream of air. For example, self-cleaning air filter 102 includes an inlet for the ambient air and an inlet for the back-flushing air stream opposite to the ambient air inlet. An impurities outlet, such as exhaust valve 118, is positioned adjacent the ambient air inlet at a location to receive the back-flushing air stream. The filter element rotates about an axis positioned between the ambient air inlet and the back-flushing air stream inlet. As the filter element rotates, a portion of the filter elements collects impurities and/or debris entering self-cleaning air filter 102 through the ambient air inlet, and another portion is being cleaned by the back-flushing air stream dislodging debris and channeling the dislodged debris into the impurities outlet. Continuous and/or period self-cleaning maintains functioning of self-cleaning air filter 102 without need of maintenance and/or inspection. Furthermore, the filter function of self-cleaning air filter 102 is continuously provided in AFC system 100 or rotor blade 12.

In the exemplary embodiment, self-cleaning air filter 102 is configured to determine a degree of clogging of the filter element of self-cleaning air filter 102. Self-cleaning air filter 102 is further configured to clean the filter element of self-cleaning air filter 102 if the degree of clogging of the filter element exceeds a clogging threshold value. In one embodiment, the degree of clogging of the filter element is determined based on a pressure difference of self-cleaning air filter 102. The pressure difference is determined as a difference in total pressure measured upstream and downstream of self-cleaning air filter 102. The pressure difference thus serves as a measure for filter clogging. Ideally, the pressure difference of self-cleaning air filter 102 is zero or near zero, however the clogging threshold value at which self-cleaning air filter 102 is cleaned depends on characteristics of self-cleaning air filter 102. The above-mentioned pressure difference can either be measured directly by a differential pressure measurement device and/or indirectly by measuring two pressure levels and subtracting them.

Referring to FIGS. 1, 2, 4, and 5, a position of exhaust valve 118 is chosen such that the impurities do not deposit on surface 20 of rotor blade 12 in order to prevent blade fouling. For example, as shown in FIG. 1, impurities are exhausted from a rear of nacelle 16; as shown in FIG. 2, impurities are exhausted from a top of nacelle 16; and, as shown in FIG. 4, impurities are exhausted from root 32 and/or trailing edge 28 of rotor blade 12. In embodiments in which AFC system 100 is located within nacelle 16, the impurities are ejected through exhaust valve 118 on a lee or rear side of rotor blade 12, hub 14, and/or nacelle 16. Thus, the wind will transport the dirt away from nacelle 16 and fouling of wind turbine 10 is prevented. In a particular embodiment, exhaust valve 118 ejects the impurities through a lateral side of rotor hub 14. In alternative embodiments, exhaust valve 118 channels the impurities to tower 18, nacelle 16, and/or to rotor blade 12. From there the impurities may be ejected to the exterior of wind turbine 10.

Alternatively, the impurities are stored in a container (not shown) that is typically located within rotor hub 14 of wind turbine 10. In such embodiments, exhaust valve 118 is in flow communication with the container. The container may be emptied or replaced with an empty container by maintenance personnel during a maintenance activity. Although being typically located at or in rotor hub 14, the container for the impurities may also be located in nacelle 16, in or at tower 18, or in or at rotor blade 12.

When the impurities are ejected into the air outside of wind turbine 10, environmental conditions, such as a wind direction, a wind speed, and/or a presence or absence of precipitation, are taken into account. Typically, the impurities are ejected at positions at trailing edge 28 of rotor blade 12 or at rotor blade root 32, in the latter case either towards a connected rotor hub 14 or directly into the air outside rotor blade 12.

Figure 6:
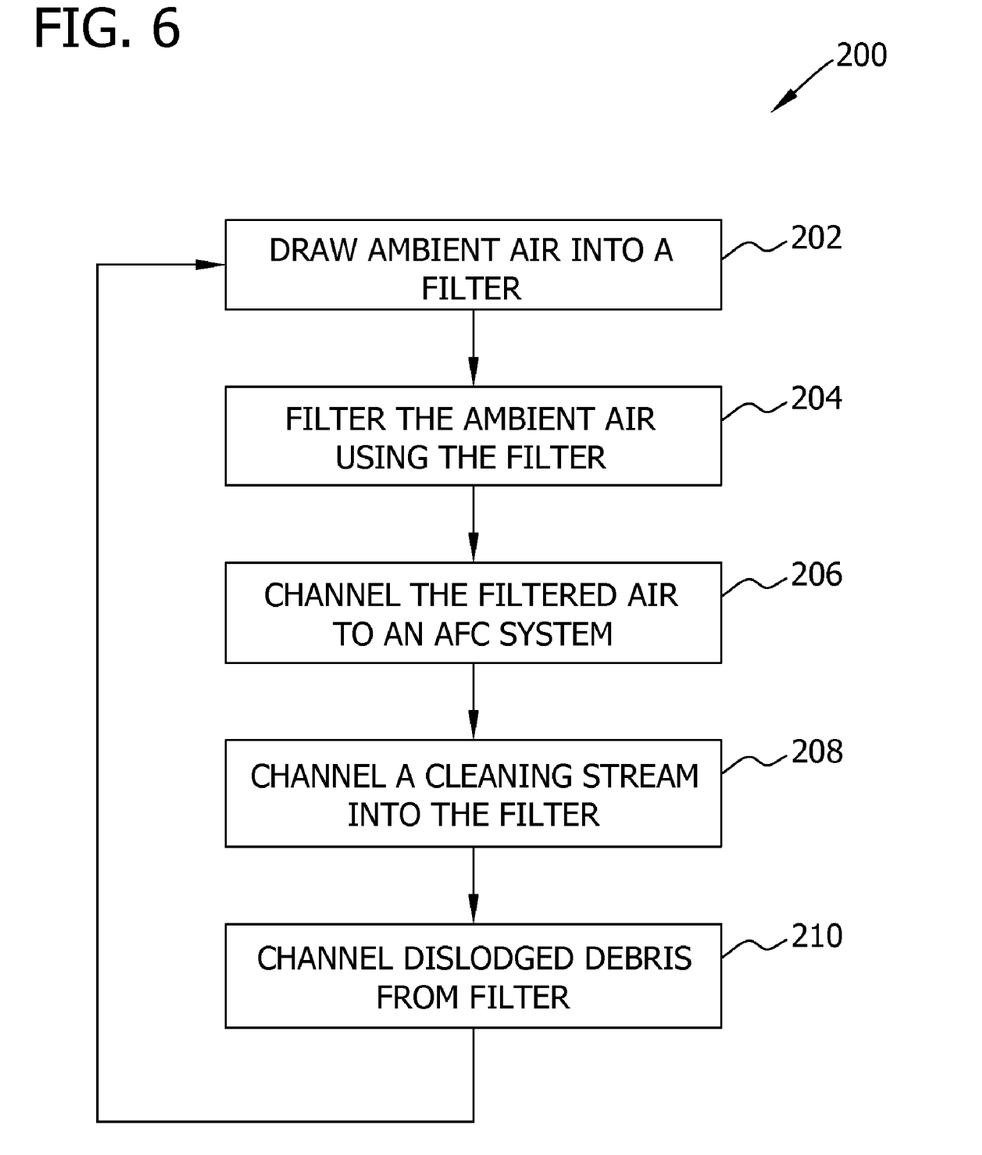
FIG. 6 is a flowchart of an exemplary method that may be used to operate the wind turbine shown in FIG. 1.

FIG. 6 is a flowchart of a method 200 of operating wind turbine 10 (shown in FIG. 1). By performing method 200, fouling of blade 12 (shown in FIGS. 1-4) and/or AFC system 100 (shown in FIGS. 1, 2, and 4) is facilitated to be corrected and/or prevented. Method 200 is performed at least partially by the wind turbine controller and/or AFC controller 110 (shown in FIGS. 1, 2, and 4) sending or transmitting commands and/or instructions to components of wind turbine 10. The wind turbine controller and/or AFC controller 110 is programmed with code segments configured to perform method 200. Alternatively, method 200 is encoded on a computer-readable medium that is readable by the wind turbine controller and/or AFC controller 110. In such an embodiment, the wind turbine controller and/or AFC controller 110 is configured to read computer-readable medium for performing method 200.

In the exemplary embodiment, method 200 is performed continuously or periodically according to a predetermined corrective schedule, a predetermined preventative schedule, condition-triggered automated operation, and/or condition-triggered manual operation. In a particular embodiment, the wind turbine controller and/or AFC controller 110 performs method 200 after the wind turbine controller, AFC controller 110, and/or a human operator determines optimal conditions exist for performing method 200. Alternatively, or additionally, the wind turbine controller and/or AFC controller 110 is configured to determine when fouling has occurred and/or will occur and perform method 200 upon making such a determination.

Referring to FIGS. 1-6, method 200 includes drawing 202 ambient air into wind turbine 10 through self-cleaning air filter 102. More specifically, ambient air is drawn 202 into self-cleaning air filter 102 through air intake duct 114. The ambient air drawn 202 into self-cleaning air filter 102 is then filtered 204 using self-cleaning air filter 102. For example, a filter element of self-cleaning air filter 102 collects debris entrained within the ambient air as the ambient air is channeled through self-cleaning air filter 102.

The filtered air is channeled 206 to AFC system 100 of wind turbine 10 to change the aerodynamic properties of at least one rotor blade 12, as described in more detail above. In the exemplary embodiment, the filtered air is channeled 206 to gas supply 108 of AFC system 100 for distribution in manifolds 104 of AFC system 100. Alternately or simultaneously with channeling 206 the filtered air, a cleaning air stream is channeled 208 into self-cleaning air filter 102 to dislodge debris collected within self-cleaning air filter 102. In the exemplary embodiment, the cleaning air stream is channeled 208 from pressurized air device 116 into self-cleaning air filter 102 as the back-flushing air stream described above. As the cleaning stream is channeled 208 through self-cleaning air filter 102, debris collected therein, such as on the filter element, is dislodged and entrained in the cleaning air stream. As the debris becomes dislodged from self-cleaning air filter 102, the debris is channeled 210 from self-cleaning air filter 102 and, thus, away from rotor blade 12 and/or wind turbine 10. More specifically, the cleaning air stream having debris entrained therein is channeled 210 from self-cleaning air filter 102, through exhaust valve 118, to an exterior of wind turbine 10 and/or to a container within wind turbine 10.

Each step 202, 204, 206, 208, and/or 210 of method 200 may be performed continuously and/or simultaneously. For example, as described above, the filter element may be rotated within self-cleaning air filter 102 to collect debris with one portion of the filter element while cleaning debris from another portion of the filter element. Such continuous cleaning of self-cleaning air filter 102 prevents self-cleaning air filter 102 from becoming clogged with debris to such an extent that the cleaning air stream is not sufficient to substantially clean self-cleaning air filter 102. However, the effectiveness of continuous or intermittent cleaning of self-cleaning air filter 102 is based on the characteristic of self-cleaning air filter 102.

A technical effect of the systems and method described herein includes at least one of: (a) drawing ambient air into a self-cleaning air filter; (b) filtering ambient air using a self-cleaning filter; (c) channel filtered air to an AFC system from a self-cleaning air filter; (d) channeling a cleaning air stream into a self-cleaning air filter to dislodge debris collected within the self-cleaning air filter; and (e) channeling dislodged debris from a self-cleaning air filter and away from a rotor blade and/or a wind turbine.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An active flow control (AFC) system for use with a wind turbine, the wind turbine including at least one rotor blade having at least one manifold extending at least partially therethrough and at least one aperture defined through a surface of the at least one rotor blade, the at least one aperture in flow communication with the at least one manifold, said AFC system comprising:
   an air intake duct configured to draw ambient air into the wind turbine;
   a self-cleaning air filter coupled in flow communication with said air intake duct and configured to filter the ambient air; and
   an AFC distribution system configured to eject the filtered air through the at least one aperture.

2. The AFC system according to claim 1, wherein said self-cleaning air filter comprises a back-flushing air filter.

3. The AFC system according to claim 2, wherein said back-flushing air filter is configured to be cleaned by a back-flushing air stream.

4. The AFC system according to claim 2, wherein said AFC distribution system comprises an gas supply configured to provide the back-flushing air stream to said back-flushing air filter.

5. The AFC system according to claim 1, wherein said self-cleaning air filter is configured to remove debris from a filter element of said self-cleaning air filter at regular intervals.

6. The AFC system according to claim 1, wherein said self-cleaning air filter is configured to:
   determine a degree of clogging of a filter element of said self-cleaning air filter; and
   remove debris from the filter element of said self-cleaning air filter when the degree of clogging of the filter element exceeds a clogging threshold value.

7. The AFC system according to claim 6, wherein the degree of clogging of the filter element is determined based on a pressure difference, the pressure difference being a difference between a pressure values measured upstream of said self-cleaning filter and a pressure value measured downstream of said self-cleaning air filter.

8. A wind turbine comprising: a rotor blade; at least one manifold extending at least partially through said rotor blade; an air intake duct configured to draw ambient air into said wind turbine; a gas supply coupled in flow communication with said at least one manifold and configured to supply gas to said at least one manifold; and a self-cleaning air filter coupled in flow communication with said air intake duct and said gas supply, said self-cleaning air filter configured to filter the ambient air and channel the filtered air to said gas supply.

9. The wind turbine according to claim 8, wherein said self-cleaning air filter comprises a back-flushing air filter configured to be cleaned by a back-flushing air stream.

10. The wind turbine according to claim 9, wherein said gas supply is configured to channel the back-flushing air stream to said self-cleaning air filter.

11. The wind turbine according to claim 8, further comprising a pressurized air device coupled to flow communication said self-cleaning air filter to supply compressed air to said self-cleaning air filter, the compressed air used by said self-cleaning air filter to perform a self-cleaning function, wherein said self-cleaning air filter channels filtered air to said pressurized air device.

12. The wind turbine according to claim 8, further comprising an exhaust valve being configured to channel debris from said self-cleaning air filter to outside said rotor blade.

13. The wind turbine according to claim 12, wherein said exhaust valve is located on a suction side of said rotor blade adjacent at least one aperture defined through a surface of said rotor blade.

14. The wind turbine according to claim 8, further comprising at least one aperture defined through a surface of said rotor blade, said at least one aperture in flow communication with said at least one manifold for ejecting air from said at least one manifold through said at least one aperture.

15. The wind turbine according to claim 8, wherein said self-cleaning air filter is configured to:
   determine a degree of clogging of a filter element of said self-cleaning air filter; and
   remove debris from the filter element when the degree of clogging of the filter element exceeds a clogging threshold value.

16. A method for operating a wind turbine including an active flow control (AFC) system having a self-cleaning air filter, said method comprising:
   drawing ambient air into the self-cleaning air filter such that debris is collected within the self-cleaning air filter;
   channeling a cleaning air stream into the self-cleaning air filter to dislodge the debris collected within the self-cleaning air filter; and
   channeling the dislodged debris from the self-cleaning air filter and away from the wind turbine.

17. The method in accordance with claim 16, further comprising:
   filtering the ambient air using the self-cleaning filter; and
   channeling the filtered air to the AFC system from the self-cleaning air filter.

18. The method in accordance with claim 17, wherein said filtering the ambient air is performed at a first portion of a filter element of the self-cleaning air filter and said channeling a cleaning air stream into the self-cleaning air filter is performed at a second portion of the filter element.

19. The method in accordance with claim 17, wherein said filtering the ambient air and said channeling a cleaning air stream into the self-cleaning air filter are performed continuously.

20. The method in accordance with claim 16, wherein the AFC system include a gas supply, channeling a cleaning air stream into the self-cleaning air filter further comprising channeling the cleaning air stream from the gas supply into the self-cleaning air filter.

* * * * *